United States Patent Office 3,496,011
Patented Feb. 17, 1970

3,496,011
METHOD OF COATING THERMALLY EMISSIVE SURFACE WITH A COMPOSITE RADIATION CONTROL COATING AND RESULTING ARTICLE
James R. Crosby, Canoga Park, Calif., Kermit R. Kreder, St. Charles, Mo., and Edgar R. Miller, Huntsville, Ala., assignors to North American Rockwell Corporation
No Drawing. Filed Sept. 10, 1965, Ser. No. 486,521
Int. Cl. B44d 1/14, 1/44
U.S. Cl. 117—69                    8 Claims

ABSTRACT OF THE DISCLOSURE

A composite radiation control coating having a high thermal emittance and a low solar absorptance for coating a thermally emissive surface. An aluminum phosphate-bonded spinel of the oxides of chromium, nickel and cobalt is applied as an adherent first layer to the substrate. An adherent aluminum phosphate-bonded tin oxide layer is then applied to the spinel layer.

---

This invention relates to a coating for a thermally emissive surface. More particularly it relates to a radiation control coating having a high thermal emittance and a low solar absorptance, and the method for providing such a coating.

Space vehicles employing auxiliary power systems are designed for extended duration missions in which thermal energy from a heat source, e.g., a nuclear reactor, is converted into electrical power. Since in any such system a substantial portion of the thermal energy developed is not converted, this energy must be dissipated by radiative emission to keep the operating temperature of the unit within safe limits. A radiator-condenser is ordinarily employed to discharge this excess thermal energy. The success of power system radiators in the space environment is dependent upon the stability of the requisite thermal control surfaces. The need exists for special coatings to provide maximum efficiency of radiation both by reflecting solar energy and also by emitting excess internally generated energy plus that part of the solar energy which is absorbed. The special requirements of an auxiliary power system operating in a space environment, such as minimum weight, completely unattended operation at high temperature, vacuum environment, and the like, create unique problems in the development of satisfactory radiation control coatings.

Typically, for a nuclear auxiliary power system, environmental requirements for a space radiator coating are duration of the coating for one year, at a vacuum of $10^{-11}$ torr, at a temperature up to 650° F., at nuclear irradiation of $10^{18}$ nvt (fast) and $10^9 R\gamma$, ultraviolet radiation for one year, aerodynamic heating from ambient to 700° F. in 140 seconds, and an ability to withstand the mechanical vibration and shock of launch stress. The coating must also be nonreactive with the substrate base.

In addition to satisfying the foregoing severe requirements, it is further desired to provide a radiation control coating of maximum thermal effectiveness. Basically, the greatest heat input to the system from space is solar radiation. Therefore, a low solar absorptance is highly desirable. Similarly, since it is necessary to reject excess internal heat as well as absorbed solar energy, a high thermal emittance is required. Thus the thermal effectiveness depends upon a low value for the ratio $\alpha_s/\epsilon$, where $\alpha_s$ is the solar absorptance and $\epsilon$ is the thermal emittance. At elevated temperatures, a change in the thermal emittance will have a greater influence on the thermal effectiveness than one in the solar absorptance.

While many protective coatings are known for a great variety of applications, none heretofore known and evaluated have been able to meet the foregoing severe requirements imposed by a space environment as well as the more usual requirements for protective coatings such as stability, adherence, nonspalling, and the like. The present coating system is a unique one in that it meets and exceeds the target requirements set for a space environment coating.

Accordingly, it is an object of the present invention to provide an effective coating for a thermal control surface operative in a space environment.

It is another object to provide a radiation control coating having a high thermal emittance and a low solar absorptance.

It is still another object to provide coated components which are stable at temperatures of at least 600° F.

It is yet another object to provide a method for coating thermally emissive surfaces with a radiation control coating.

In accordance with the present invention, a dual composite coating is provided consisting essentially of an aluminum phosphate-bonded spinel of the oxides of chromium, nickel, and cobalt as an adherent first layer overlying the thermally emissive surface; overlying this spinel layer is an adherent aluminum phosphate-bonded tin oxide layer. In practicing the present invention, the heat emissive surface is first coated with a mixture consisting essentially of aluminum phosphate, chromium oxide, nickel oxide and cobalt oxide, with silicon dioxide optionally present. The mixed coating is then heated to form a thin-film cured layer; this layer is then coated with a mixture consisting essentially of tin oxide and aluminum phosphate, which is then heated to form a cured thin-film layer adherent to the underlying coating, thereby forming a composite radiation control coating having a high thermal emittance and a low solar absorptance.

It is particularly preferred and, in certain applications may be considered essential where it is desired to obtain a composite coating having an $\alpha_s$ below 0.40 and an $\epsilon$ above 0.85, while providing satisfactory adherence and anti-spalling, that the thickness of the composite coating be between 1 and 5 mils, preferably about 3 mils.

In a preferred method of practicing the invention, the chromium oxide, nickel oxide, and cobalt oxide are combined in a molecular ratio of 0.75:1.00:0.25, respectively. This mixture of oxides of chromium, nickel, and cobalt is referred to as a spinel. This spinel is then mixed with silicon dioxide, aluminum phosphate, and distilled water and formed into a slurry. This slurry is conveniently applied as a thin film about 1 to 2 mils thick after curing, by conventional paint-spray techniques and then cured at about 600° F. The resultant spinel layer, which is green in appearance, has a high thermal emittance and is chemically and thermally stable over the anticipated exposure temperature range from ambient to 600° F. The overlying cover coat mixture consists of a slurry of stannic oxide, aluminum phosphate and distilled water. It is also applied as a thin film, about 1 to 2 mils in thickness after curing, by spraying over the cured spinel film. The tin oxide cover coat is then cured at 600° F. This tin oxide coat is white in appearance and gives high reflectance in the 0.2 to 2 micron range and contributes to the emittance at longer wave lengths.

The composite radiation control coating of this invention is considered applicable to any heat emissive surface. Usually a substrate metal such as copper, aluminum, or a metal alloy is used. A thin film of a high temperature glass may be first applied on the substrate metal where required for protection of the metal during application of the coating or in use to prevent oxidation.

In applying the composite coating it may be necessary to make slight procedural or other modifications to maintain adequate thermal expansion match and adherence between the coating and the substrate to which it is applied. Under certain conditions it may be desirable or necessary to make the coating discontinuous to prevent spalling during temperature cycling. Thus sections up to a foot in their largest dimension may be used, with the width of the lines creating the discontinuities being about $\frac{1}{32}$ inch. Generally the substrate base is first cleaned using conventional methods, depending upon the particular metal being cleaned. The composite coating has been satisfactorily applied on substrates of copper, copper-coated steel, steel, aluminum, titanium, beryllium, Nichrome, and Inconel, both with and without intermediate layers of glass being present.

The following example is illustrative but not limiting of the practice of this invention.

EXAMPLE

Reagent-grade powders of $Cr_2O_3$, $NiO$, and $Co_2O_3$ were respectively combined in a 0.75:1.00:0.25 molecular ratio. The mixture was then heated in air at 2100° F. ($\pm 100°$) for a minimum of two hours to form a chromium-nickel-cobalt spinel. The sintered mixture was then cooled to room temperature and ball-milled to a fine particle size.

The following formulation was used for the first coat:

| Material: | Parts by weight |
| --- | --- |
| Cr-Ni-Co spinel | 65 |
| Silicon dioxide 99% purity —200 mesh | 40 |
| Aluminum phosphate | 87 |
| Distilled water | 42 |

The foregoing formulation was ball-milled, and the resultant slurry was passed through a 325-mesh U.S. standard sieve size screen. For convenience in spraying, the specific gravity of the slurry was maintained between 1.81 and 1.86.

Base substrates of aluminum and copper were first solvent cleaned and then mechanically roughened by grit blasting. After recleaning and suitable masking, the substrate metal was coated by spraying a layer of desired thickness of the formulated slurry, using bottled nitrogen gas as spray carrier, so that one full wet coat was uniformly applied. A sufficient amount of material was applied so that the film thickness of the coated material after baking was between about 1 and 2 mils. After spraying, the coated part was air dried and then baked at a temperature of 600±25° F.

The final coating was formulated as follows:

| Material: | Parts by weight |
| --- | --- |
| Reagents grade stannic oxide, $SnO_2$ | 120 |
| Aluminum phosphate | 87 |
| Distilled water | 92 |

The formulated materials were mixed and ball-milled. The resultant slurry was passed through a 325-mesh screen. It had a specific gravity between 1.70 and 1.75. A thin primer coat of this slurry was uniformly sprayed on the cured spinel coat. The primer coat was air dried and then baked at 600° F. Then a final tin oxide coat was applied in a manner similar to the primer coat, and similarly dried and cured. Optionally the primer coat was omitted and one final tin oxide coat of desired thickness was applied. The total thickness of the primer and final coats was maintained between 0.3 and 1 mil. The dual composite coating was approximately 3 mils in thickness.

The long-term stability of the composite coating was determined by maintaining the coating at a temperature of 600° F. for 5900 hours at $10^{-5}$ torr. It was found that the total hemispherical emittance increased from 0.91 to 0.93 during this period.

In an aerodynamic heating test, the coating was applied to 2 x 3 ft. panels of aluminum and copper. The ascent heat-up rate for the copper panel was from ambient to 680° F. in 141 seconds. The ascent heat-up rate for the aluminum panel was from ambient to 770° F. in 141 seconds. Each panel underwent ten cycles using these heat-up rates. No damage to the coating occurred during either test.

In nuclear irradiation studies, four samples were irradiated to a neutron flux level of $3 \times 10^{18}$ nvt. The maximum gamma exposure was $1.9 \times 10^{10}$R. During the irradiation test, the samples were maintained at 600° F. at $10^{-5}$ torr, for 288 hours. The change in total hemispherical emittance of three of the samples was about 1 percent. The four sample experienced a change in emittance of 2 percent. The foregoing results clearly indicate that the coating is quite stable in the nuclear irradiation environment used.

In other tests, the coating was subjected to electron irradiation and ultraviolet irradiation. The coated specimen was maintained at 600° F. and received an integrated electron dosage of $3 \times 10^{18}$, 1.25-mev. energy. The change in total hemispherical emittance of the coating noted during these tests was within the 2 percent uncertainty of the emittance measuring device. In the ultraviolet irradiation tests, a sample irradiated at a solar equivalent time of 1000 hours at a temperature of 150° F. showed a change in $\alpha_s$ of 0.03. At 600° F. for 1000 hours solar equivalent time, the change $\alpha_s$ was 0.06. The foregoing results indicate that a slight degradation does occur with respect to solar absorptance, particularly at higher temperatures. In 3000-hour tests at 600° F., a 30 percent increase was obtained in solar absorptance.

The total hemispherical emittance of the composite coating varied between 0.89 and 0.92 at 600° F. Depending upon the thickness of the coat, the solar absorptance varied from 0.30 to 0.35, the thicker tin oxide coating providing a lower solar absorptance. However, because of adherence considerations, the thickness of the coating is limited.

When a copper substrate was used, with a glass subcoating, the total weight of the combined coatings was 0.042 to 0.045 lb./sq. ft., well within the maximum acceptable weight limit of 0.05 lb./sq. ft.

Heat transfer efficiency of the coating is determined by both the heat emittance and solar absorptance. Total hemispherical emittance is determined by measuring the power required to maintain an emitting specimen at constant temperature. The specimen is enclosed in an evacuated non-reflecting test cell whose outer walls are cooled by liquid nitrogen. Electrical energy is supplied at a constant rate to the specimen, which eventually reaches an equilibrium temperature over a portion of its area. At the steady-state condition, the power to the specimen volume enclosed by this area portion is equal to the radiation from this area portion. The total hemispherical emittance may then be readily calculated.

The solar absorptance measurements are determined by measuring the ultraviolet, visible and near infrared reflectances with a spectrophotometer having an integrating sphere attachment. All measurements are made by comparison to a freshly prepared magnesium oxide standard, which is an accepted reflectance standard in the short wave length region.

The composite coating of this invention represents a significant breakthrough in radiation control coating. Thus where comparison was made with many other materials, it was found, for example, that use of the aluminum phosphate binder, compared with a potassium silicate binder, resulted in a thermal emittance at 600° F. consistently higher by about 5 percent. The solar absorptance of coatings using the aluminum phosphate binder was consistently between 10 and 20 percent higher than coatings with a potassium silicate binder. Similarly, the white pigment which was stable and exhibited the highest thermal emittance at 600° F. was stannic oxide.

It will of course be apparent to those skilled in this art that variations may be made in specific formulation techniques, coating procedures, and the like. However, it will also be recognized that in order to optimize thermal emittance characteristics and minimize solar absorptance characteristics, careful attention must be paid to the quality of the materials employed so that the substrate surfaces being coated are not contaminated during processing. Thus other modifications of this invention will also suggest themselves to those skilled in the art with respect to the particular combinations of steps shown in addition to those specifically described and illustrated herein.

We claim:

1. A method for coating a thermally emissive surface with a composite radiation control coating having a high thermal emittance and a low solar absorptance which comprises the steps of coating said thermally emissive surface with a first layer of a mixture consisting essentially of aluminum phosphate, chromium oxide, nickel oxide, and cobalt oxide, heating said first layer to form a first cured film, coating said first cured film with a second layer of a mixture consisting essentially of stannic oxide and aluminum phosphate, and heating said second layer to form a second cured film adherent to the underlying first cured film.

2. A method for coating a thermally emissive surface with a composite radiation control coating having a high thermal emittance and a low solar absorptance which comprises the steps of spraying said thermally emissive surface with a first aqueous slurry of a mixture consisting essentially of aluminum phosphate, chromium oxide, nickel oxide, and cobalt oxide, heating said sprayed surface to form a first cured film spraying said first cured film with a second aqueous slurry of a mixture consisting essentially of stannic oxide and aluminum phosphate, and heating the second sprayed mixture to form a second cured film adherent to the underlying first cured film.

3. A method for coating a thermally emissive surface with a composite radiation control coating having a high thermal emittance and a low solar absorptance which comprises the steps of spraying said thermally emissive surface with a first aqueous slurry of a mixture consisting essentially of, in parts by weight, chromium-nickel-cobalt spinel 65, silicon dioxide 40, aluminum phosphate 87, and distilled water 42, heating said sprayed surface to form a first cured film, spraying said first cured film with a second aqueous slurry of a mixture consisting essentially of, in parts by weight, stannic oxide 120, aluminum phosphate 87, and distilled water 92, and heating the second sprayed mixture to form a second cured film adherent to the underlying first cured film.

4. The method according to claim 3 wherein the chromium-nickel-cobalt spinel consists of chromium oxide, nickel oxide, and cobalt oxide in a 0.75:1.00:0.25 molecular ratio, respectively.

5. A coated heat radiator having a high thermal emittance and a low solar absorptance which comprises a thermally emissive surface, a first thin film disposed on said surface consisting essentially of an aluminum phosphate-bonded spinel of the oxides of chromium, nickel, and cobalt, and a second thin film adherently disposed on said first film consisting essentially of aluminum phosphate-bonded stannic oxide.

6. A coated heat radiator according to claim 5 wherein the total thickness of the combined films is between 1 and 5 mils.

7. A coated heat radiator having a high thermal emittance and a low solar absorptance which comprises a thermally emissive surface, a first thin film disposed on said surface consisting essentially of an aluminum phosphate-bonded spinel of the oxides of chromium, nickel, and cobalt, said spinel respectively containing chromium oxide, nickel oxide, and cobalt oxide in a 0.75:1.00:0.25 molecular ratio, and a second thin film adherently disposed on said first film consisting essentially of aluminum phosphate-bonded stannic oxide.

8. A coated heat radiator according to claim 7 wherein the thickness of the stannic oxide film is less than 1 mil and the total thickness of the combined films is between 1 and 5 mils.

References Cited

UNITED STATES PATENTS

| 2,781,636 | 2/1957 | Brandes et al. | 117—129 X |
| 2,917,817 | 12/1959 | Tabor. | |
| 3,176,933 | 4/1965 | Clemmons. | |
| 3,198,674 | 8/1965 | Huppke | 117—127 X |
| 3,225,208 | 12/1965 | Wolfe. | |
| 3,284,225 | 11/1966 | Smock et al. | 117—129 X |

FOREIGN PATENTS

| 6413375 | 6/1965 | Netherlands. |

OTHER REFERENCES

Plunkett, J. D.: NASA Contributions to the Technology of Inorganic Coatings. Washington, D. C., NASA, November 1964. pp. 32, 37, 63, 99. TL521–A35s No. 5014.

ALFRED L. LEAVITT, Primary Examiner

J. R. BATTEN, JR., Assistant Examiner

U.S. Cl. X.R.

117—70, 127, 129; 165—133; 244—1